(12) United States Patent
Lahtinen

(10) Patent No.: US 6,275,708 B1
(45) Date of Patent: Aug. 14, 2001

(54) METHOD AND ARRANGEMENT FOR LIMITING PAGING LOAD IN A MOBILE COMMUNICATION SYSTEM

(75) Inventor: Lauri Lahtinen, Espoo (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/117,922

(22) PCT Filed: Feb. 4, 1997

(86) PCT No.: PCT/FI97/00063

§ 371 Date: Dec. 3, 1998

§ 102(e) Date: Dec. 3, 1998

(87) PCT Pub. No.: WO97/29610

PCT Pub. Date: Aug. 14, 1997

(30) Foreign Application Priority Data

Feb. 6, 1996 (FI) .................................................. 960542

(51) Int. Cl.$^7$ .................................................. H04Q 7/20
(52) U.S. Cl. ........................ 455/458; 455/459; 455/453; 455/435
(58) Field of Search .................... 455/458, 459, 455/432, 433, 435, 453, 31.1, 31.2, 31.3, 426

(56) References Cited

U.S. PATENT DOCUMENTS

| 5,521,905 | * | 5/1996 | Oda et al. ............................... 370/17 |
| 5,621,784 | * | 4/1997 | Tiedemann, Jr. et al. ........... 455/435 |
| 5,722,067 | * | 2/1998 | Fougnies et al. ..................... 455/406 |
| 5,754,959 | * | 5/1998 | Ueno et al. ........................... 455/453 |

FOREIGN PATENT DOCUMENTS

| 340 665 | 11/1989 | (WO) . |
| 92/10042 | 6/1992 | (WO) . |
| 96/01030 | 1/1996 | (WO) . |

* cited by examiner

*Primary Examiner*—Nay Maung
*Assistant Examiner*—Lewis G. West
(74) *Attorney, Agent, or Firm*—Pillsbury Winthrop LLP

(57) ABSTRACT

A method and arrangement for limiting the paging load of a mobile communication system. The number of calls initiated during a given time interval is counted and the number of calls to be initiated during a given time interval is counted and the number of calls to be initiated is limited to a predetermined maximum value. The system is implemented with a counter that counts the number of calls to be initiated during given time interval, a timer which measures the desired time interval and a comparator for limiting the number of calls to be initiated to a predetermined maximum value.

8 Claims, 3 Drawing Sheets

METHOD AND ARRANGEMENT FOR LIMITING PAGING LOAD IN A MOBILE COMMUNICATION SYSTEM

FIELD OF THE INVENTION

The invention relates to a method and an arrangement for limiting the paging load in a mobile communication system when mobile stations are being paged.

BACKGROUND OF THE INVENTION

Location information on a mobile station is needed in mobile communication systems for routing of calls and for other services. FIG. 1 in the attached drawings shows a simplified example of the structure of a GSM mobile communication system as a block diagram. The units shown in the Figure are also found in other mobile networks, but may have different names. A mobile station MS in standby or active mode is in continuous connection with a Base Transceiver Station BTS. A Base station subsystem BSS comprises a Base Station Controller BSC and its subordinate base stations BTS. Usually a plurality of base station controllers BSC are subordinate to a Mobile Services Switching Centre MSC. The Mobile Services Switching Centre MSC switches messages to other mobile services switching centres. Location information on a mobile station MS and other subscriber data are in permanent storage in a Home Location Register HLR of the system and temporarily in the Visitor Location Register VLR in whose area the mobile station MS is located at each particular moment. The visitor location register VLR comprises subscriber data required for all mobile stations MS in the area of the VLR.

The geographical area supervised by a visitor location register is divided into one or more Location Areas LA1 to LA3, within each of which a MS can move freely without notifying the VLR. One or several base stations BTS may operate in each location area. Base stations BTS continuously transmit information on themselves and their environment, such as a Base Statior Identity Code BSIC and a Location Area Identifier LAI. On the basis of the latter, a mobile station MS locked to a base station STS knows in which particular location area LA it is located. When the base station BTS is being changed and the mobile station MS detects that the location area identifier LAI of the base station has changed, the mobile station sends a location update request to the network. The location area of the mobile station MS is updated in the visitor location register VLR within whose area the mobile station is located at each particular moment. Information on the VLR within whose area the MS is located is transmitted to the home location register HLR.

A visitor location register VLR may lose the subscriber data due to VLR failure, software update, or restart following equipment maintenance. To recover from this, the visitor location register VLR has to request update of necessary subscriber data from the home location register HLR. Accurate location information can, however, be received from mobile stations only. In this case a mobile station MS has to be paged in all location areas LS of the visitor location register VLR involved. If a visitor location register serves a large number of subscribers, paging a mobile stations causes significant overload mainly in three sectors: 1. between the mobile services switching centre MSC and the base station subsystem BSS, 2. in the base station subsystem BSS signalling process, and 3. on radio channels. Location information is not updated until the data are needed, i.e. when service has to be offered to a mobile subscriber, e.g. in case of an incoming call, or when the mobile station establishes connection in order to make a call or to update its location. In practice the location update often occurs simultaneously for each MS. Prior art systems cannot prevent overload in a mobile system in this situation. Normal network operation can also cause overload in a mobile system if an exceptionally large number of subscribers is located in a particular location area LA, and they load the base station subsystem BSS with calls and location updates.

BRIEF DESCRIPTION OF THE INVENTION

It is an object of this invention to prevent mobile system overload while storing and/or updating location information relating to mobile stations in a visitor location register.

It is a further object of the invention to prevent mobile system over-load when a large number of subscribers is located in a particular location area.

This new kind of call load limiting is achieved with the method of the invention, which is characterized in that the number of calls initiated during a given time interval is counted and the number of calls to be initiated is limited to a predetermined value.

The invention also relates to an arrangement of limiting call load in a mobile system. The arrangement is characterized in that the mobile system comprises counting means for counting the number of calls to be initiated during a given time interval, means for measuring the desired time interval, and comparison means for limiting the number of calls to be initiated to a predetermined maximum value.

The invention is based on the idea that initiated during a given time interval the number of calls is limited to a number proportional to the performance of the mobile system.

In the method of the invention the number of calls initiated in order to call mobile stations is counted. Time measurement is started when a call is initiated. After a predetermined time from initiation of the call it can be removed from the number of initiated calls. New calls are initiated on request until the number of calls counted is equivalent to a maximum allowed number of calls to be initiated during the interval. The situation corresponds to a maximum call load that must not be exceeded. New calls cannot be initiated until a predetermined time has passed from the start of a call that was initiated earlier, and that call has been removed from the number of calls counted.

The advantage of such a paging load limitation is that the radio units in a mobile system do not become overloaded and thus other system operations are not jeopardised.

It is a further advantage of the arrangement of the invention that changes in an existing system can be implemented with relatively small changes, e.g. in the software of the mobile services switching centre MSC.

The changes are compatible with existing systems in all respects. Thus centres in which the change of the invention has been implemented, and centres where this change has not been implemented, can flexibly be used simultaneously in the network.

DESCRIPTION OF THE DRAWINGS

In the following the invention will be described in greater detail with reference to the accompanying drawings, in which.

DETAILED DESCRIPTION OF THE INVENTION

The present invention can be applied in connection with any mobile system. The invention is described below in greater detail by means of an example in connection with the Pan-European digital mobile communication system GSM.

Figure 1:
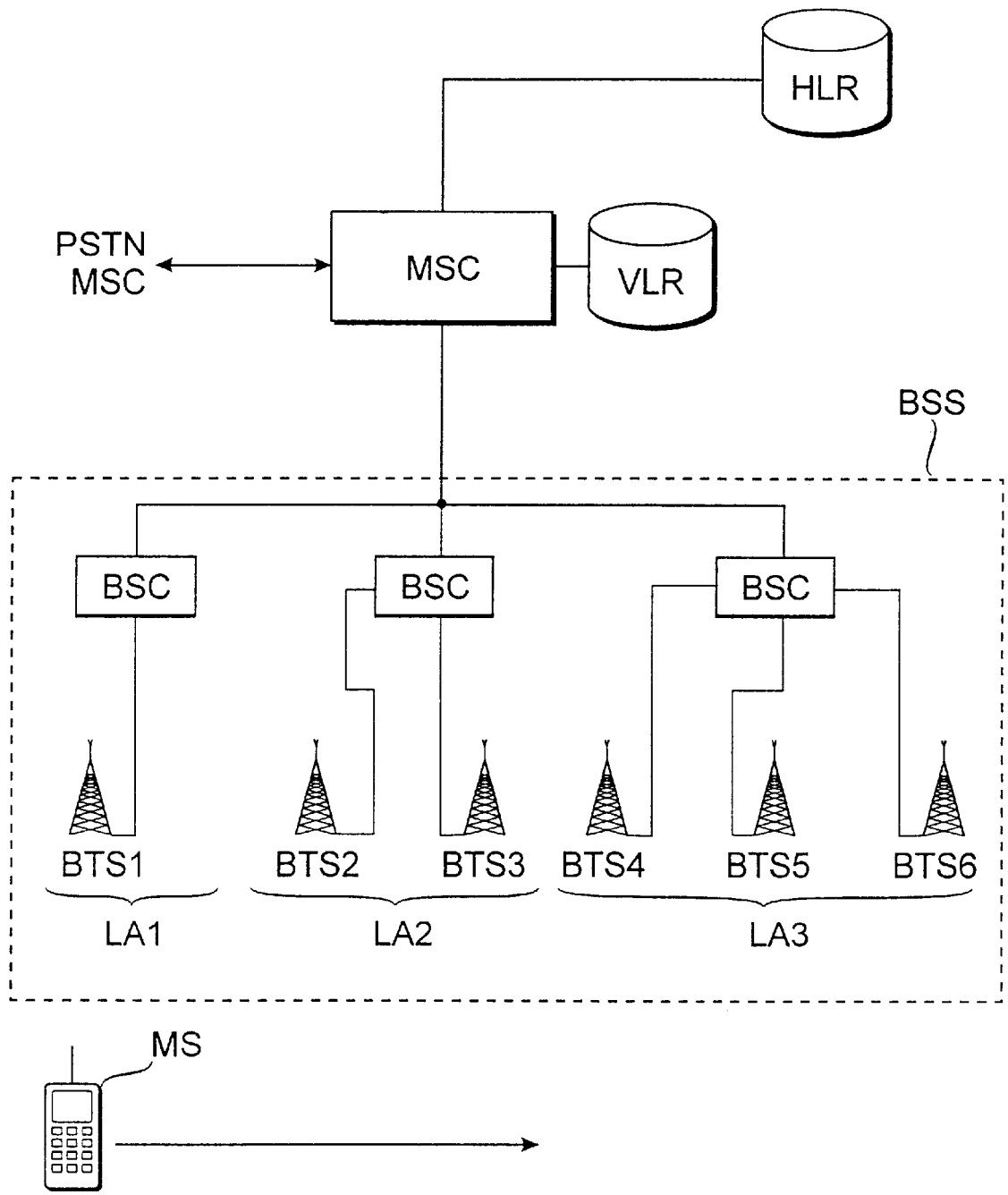
FIG. 1 shows the essential parts of a mobile system applicable to the invention.

FIG. 1 shows the previously described simplified structure of a GSM network. As to a more precise description of the GSM system, reference in made to the GSM recommendations and the publication "The GSM System for Mobile Communications", M. Mouly & M. Pautet, Palaiseau, France, 1992, ISBN:2-9507190-0-7.

The invention is described below with reference to call limiting in a single mobile services switching centre. It is advantageous to limit the calls of a mobile services switching centre MSC especially when updating the mobile station MS location information stored in the visitor location register VLR by inquiries directed to the mobile stations. The method of the invention can also be applied to limiting calls that pass via a given base station subsystem BSS.

In the method of the invention the number of calls to be initiated is counted. The number of calls $N_{max}$ to be initiated during a predetermined time interval Tit under study, measured by means of a call-specific timer, is limited ($N_{max}/T_{int}$). The number $N_{max}$ of allowed calls is preferably set to a smaller value than the system call load processing capacity, also allowing for other signalling or a decrease in system performance, The time interval $T_{int}$ under study and the number of calls $N_{max}$ to be initiated can be set by an operator and can be set e.g. separately for each mobile services switching centre MSC. The processing capacity is determined by the weakest unit of the network as regards call load, e.g. the base station subsystem BSS, the calling channel of a single base station BTS, or exceptionally, the mobile services switching centre MSC.

The method of the invention is implemented e.g. by means of counting, timing, and comparison means arranged in connection with a mobile services switching centre MSC. The counting means can be e.g. counters. E.g. timers can be used as timing means, and their number should be adequate for timing of each call to be initiated. The current values of the counting means, e.g. counters, are compared by means of the comparison means with a preset counter threshold value.

Figure 2:
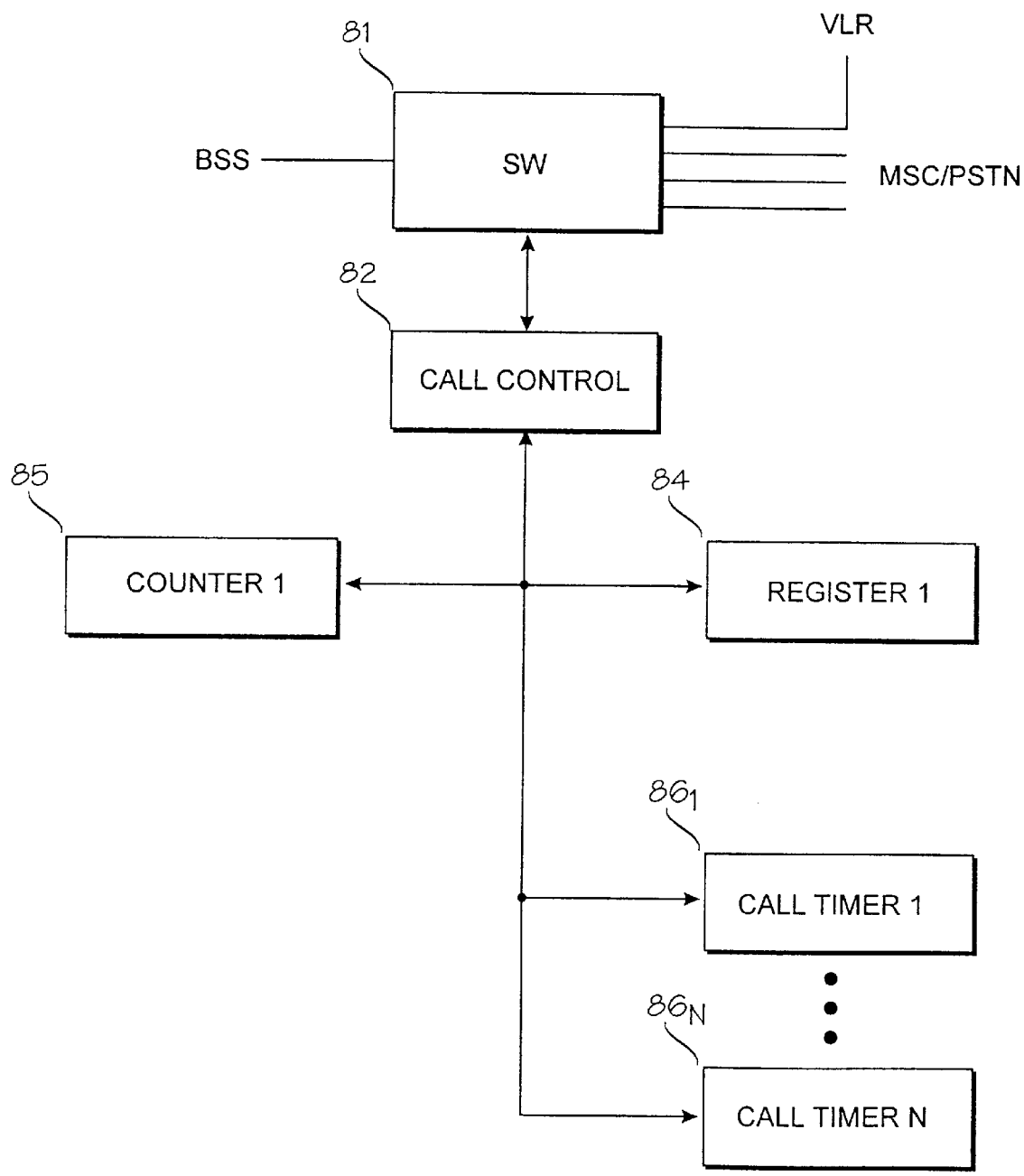
FIG. 2 is a block diagram of a mobile services switching centre implementing a preferred embodiment of call load limiting conforming with the invention.

The primary embodiment of the invention is described in the following with reference to FIG. 2. FIG. 2 shows a block diagram of a mobile services switching centre MSC conforming with the invention, showing only the components of a mobile services switching centre relevant to the invention. The mobile services switching centre of FIG. 2 comprises a digital switch 81, via which the mobile services switching centre MSC is linked to base station subsystems BSS, other mobile services switching centres MSC, a public telephone network PSTN, a visitor location register VLR etc. Switch 81 connects calls to a mobile station MS. The operation of the mobile services switching centre MSC is controlled by a call control computer 82, which also controls the operation of a switch SW. A register 84 contains preset parameters: the time interval $T_{int}$ to be studied and the number of calls $N_{max}$ to be initiated. A counter 85 counts the number of calls initiated in the mobile system MSC concerned. In addition there is a number of call-specific call timers $86_1$–$86_N$ for measuring the time lapsed from the initiation of each call. The call control computer 82 uses these timers, the register, and the counter in accordance with the invention for call load limiting, as will be explained below.

Figure 3:
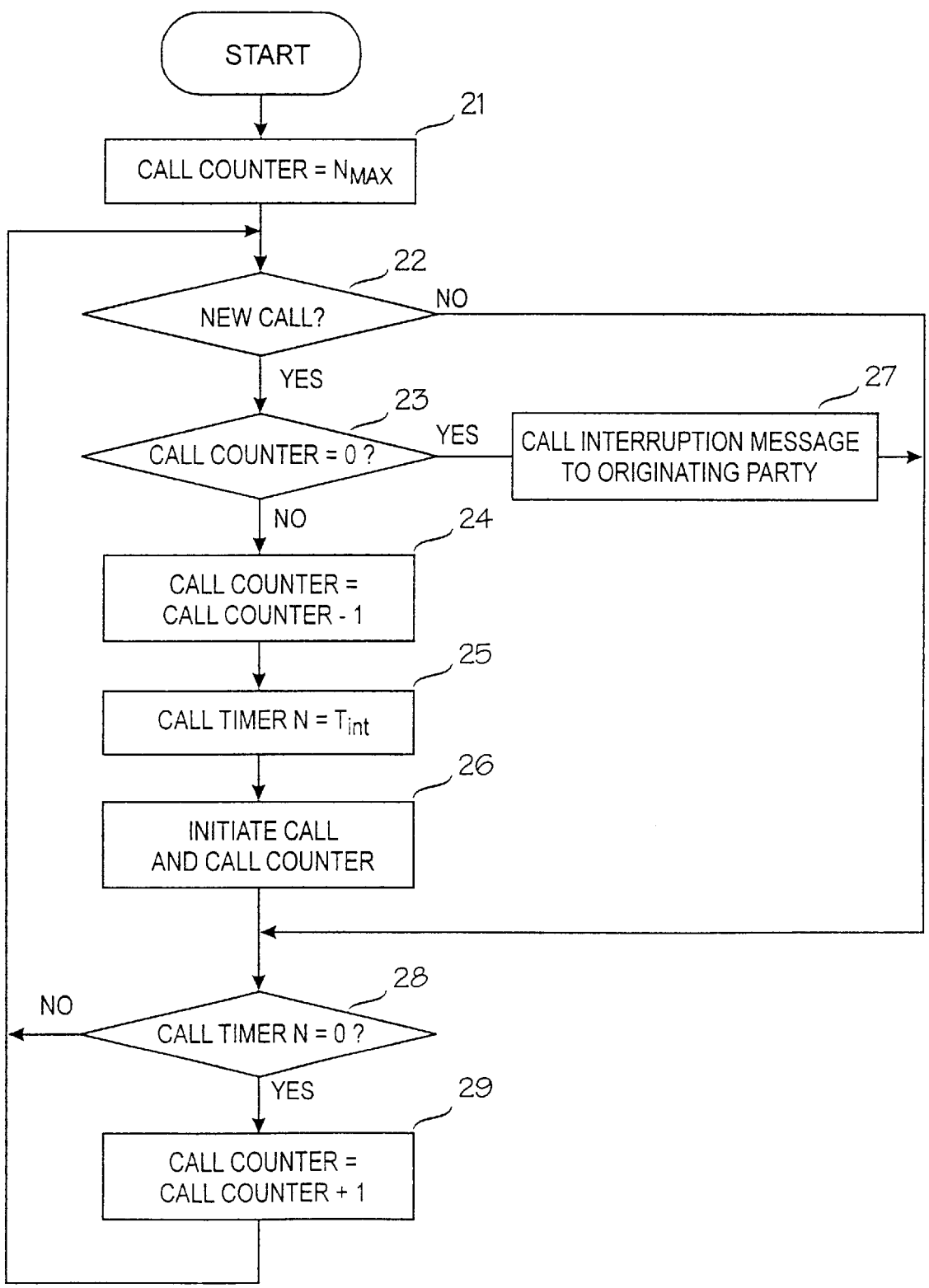
FIG. 3 shows a preferred embodiment of the method of the invention as a flow diagram.

FIG. 3 shows a primary embodiment of the method of the invention as a flow diagram with regard to one mobile services switching centre MSC. When the method is implemented or when the variables are redefined, the call counter counting proportionally to the number of calls to be initiated is initialised to the value $N_{max}$ (step 21 in FIG. 3). The initial value of the call counter together with the threshold value of the call counter limits the number of calls initiated during the time interval under study. When the mobile services switching centre MSC has to send a call to a certain mobile station MS (step 22), a check is made to see if the value of the call counter has reached the preset threshold value, in this case 0 (step 23). When the value of the call counter exceeds 0, a predetermined call step, in this case 1, is deducted from the value of the call counter (step 24).

The time interval chosen to be studied is measured with a call-specific call timer which has not been in use, i.e. a new call counter is chosen for each call to be initiated. In step 25 the call counter is initialised using the value $T_{int}$ of the time interval under study and in step 26 the call and the corresponding call timer are initiated. Time measurement of call timers in operation is monitored (step 28). When the time under study to be measured is terminated in a call counter, a call step, in this case 1, is added to the value of the call counter (step 29).

Once the call counter reaches a preset threshold value, 0 in FIG. 3, the party requesting the call is notified that the call cannot be initiated (step 27). Using the GSM system as an example, this notification can be effected by a "No Paging Response" message. New calls cannot be initiated until the time interval under study is terminated in one of the call timers and the value of the call counter has been increased so as to exceed the threshold value.

The operation of the embodiment of FIG. 3 can be illustrated by the following example. The numerical values used in the example have been chosen merely to clarify the idea of the invention. If the initial value $N_{max}$ of the call counter is initialised e.g. to the value 50 and the time interval $T_{int}$ under study is set to 1 s, 50 calls per second are allowed to be initiated in the mobile services switching centre. Each initiated call decreases the call counter value by one. During one second after the first call request a total of 50 calls can be initiated. Should a $51^{st}$ call request be made during this second, initiation of a new call is prevented and termination of the time interval under study of the first call is awaited.

In other embodiments of the method the call counter can also count in the opposite direction as compared with the above downward counting counter. The initial set value of the call counter and the threshold value have to be set properly, e.g. by exchanging the numerical values of the initial set value and the threshold value of the embodiment of FIG. 3. When an upward counting counter is used, the counter value is increased by a call step before the call is initiated and the call counter is decreased by a call step when the call timer reaches a predetermined timer threshold value. The call step value must be chosen so that the call counter threshold value set will be reached by this call step with sufficient call load.

Time measurement of call timers can be implemented by upward or downward counting. In each case, monitoring the termination of the call timer counting must be arranged appropriately. In the embodiment of FIG. 3, downward counting call timers are used. As each initiated call initiates is own call timer, a sufficient number of call timers must be available for measuring the time interval under study of the allowed calls.

Another embodiment of the method of the invention is especially suited to limiting calls in a location area of a mobile system in normal mode. In this embodiment the number of calls to be initiated is counted separately for each location area. The time interval under study $T_{int}$ and the number of calls $N_{max}$ to be initiated can be set separately for e.g. each base station controller BSC in accordance with their performance.

The arrangement of limiting the call load in a location area can be located in a mobile services switching centre MSC or some other part of the network, e.g. in connection with the base station subsystem BSS. In the arrangement of this embodiment each location area has its own counter. A comparator can be arranged for each counter. Each location area has its own register comprising parameters preset by an operator.

The method of the invention is in continuous operating mode in a mobile system. When mobile station MS location information stored in a visitor location register VLR is being updated, the paging load rapidly decreases after restart of the visitor location register VLR and thus the method does not essentially limit normal network operation.

The drawings and the description are intended to illustrate the inventive idea. As to the details, the method and arrangement of call load limiting of the invention may vary within the scope of the appended claims.

What is claimed is:

1. A method for limiting a paging load in a mobile communication system comprising:

limiting a number of calls to be initiated to a predetermined maximum value;

counting a number of calls initiated during a given time interval;

performing one of decreasing and increasing said number of calls to be initiated when a new call is initiated;

measuring time lapsed from the initiation of the new call; and performing one of increasing and decreasing said number of calls to be initiated, respectively, when said given time interval has lapsed from the initiation of the new call.

2. A method as claimed in claim 1, wherein the limiting comprises preventing initiation of new calls when said number of counted calls equals said predetermined maximum value.

3. A method as claimed in claim 2 further comprising:

setting a call counter to a predetermined value in connection with implementation, the call counter being for counting the number of initiated calls; and initiating a call, the initiating comprising:

comparing a value of the call counter with a predetermined counter threshold value;

preventing call initiation and sending a message concerning the preventing to a subscriber when the value of the call counter is equal to the counter threshold value;

performing one of decreasing and increasing the call counter value in response to the call counter value differing from the counter threshold value, the call counter value being one of decreased and increased by a predetermined call step;

setting a call-specific call timer measuring said given time interval to a predetermined value;

starting the call timer and mobile station paging; and;

respectively performing one of increasing and decreasing the call counter value by a call step when the call-specific call timer reaches a predetermined timer threshold value.

4. A method as claimed in claim 1, 2, or 3 wherein said predetermined maximum value limiting the number of calls to be initiated is smaller than a maximum number of calls which the mobile communication system is able to handle simultaneously.

5. A method as claimed in claim 1, 2, or 3 wherein the method is used to limit a call load in a location area.

6. A method as claimed in any one of claims 1, 2, or 3, wherein the method is used to limit a call load of a mobile services switching centre when mobile station location data stored in a visitor location register are updated by paging a mobile station and by inquiring of the location area of the mobile station.

7. An arrangement for limiting a call load in a mobile communication system, comprising:

counting means for counting a number of calls initiated during a given time interval;

second means for limiting the number of calls to be initiated to a predetermined maximum value;

means for performing one of increasing and decreasing said number of calls to be initiated when a new call is initiated;

means for measuring time lapsed from the initiation of the new call; and means for respectively performing one of decreasing and increasing said number of calls to be initiated when said given time interval has lapsed from the initiation of the new call.

8. An arrangement as claimed in claim 7, wherein the arrangement is located in a vicinity of a mobile services switching centre.

* * * * *